United States Patent
Bitar et al.

(10) Patent No.: US 7,634,335 B2
(45) Date of Patent: Dec. 15, 2009

(54) DISTANCE ESTIMATING METHOD FOR AIRCRAFT TAKING AIR NAVIGATION RESTRICTIONS INTO ACCOUNT

(75) Inventors: Elias Bitar, Toulouse (FR); Nicolas Marty, Saint Sauveur (FR)

(73) Assignee: Thales, Neuilly sur Seine (FR)

( * ) Notice: Subject to any disclaimer, the term of this patent is extended or adjusted under 35 U.S.C. 154(b) by 631 days.

(21) Appl. No.: 11/578,836

(22) PCT Filed: Mar. 22, 2005

(86) PCT No.: PCT/EP2005/051320

§ 371 (c)(1),
(2), (4) Date: Oct. 19, 2006

(87) PCT Pub. No.: WO2005/114109

PCT Pub. Date: Dec. 1, 2005

(65) Prior Publication Data

US 2007/0219705 A1 Sep. 20, 2007

(30) Foreign Application Priority Data

Apr. 20, 2004 (FR) .................................. 04 04145

(51) Int. Cl.
*G05D 1/06* (2006.01)
(52) U.S. Cl. ...................... 701/8; 701/200; 701/301; 701/4; 701/9; 340/974; 340/945; 340/970; 342/63; 342/65
(58) Field of Classification Search .................... 701/4, 701/8–9, 120, 200, 301; 342/63, 65; 340/970, 340/973, 945, 974
See application file for complete search history.

(56) References Cited

U.S. PATENT DOCUMENTS

| 4,646,244 | A | | 2/1987 | Bateman et al. |
| 5,978,715 | A | * | 11/1999 | Briffe et al. ................... 701/11 |
| 6,038,498 | A | * | 3/2000 | Briffe et al. ................... 701/3 |

(Continued)

FOREIGN PATENT DOCUMENTS

AU      8539396 A  *  8/1985

(Continued)

OTHER PUBLICATIONS

Wilkins, Robert R., Jr., "Use of Predictive Perspective Guidance Displays for Increased Situational Awareness" presented at the American Helicopter Society 57.sup.th Annual Forum, Washington, D.C., May 9-11, 2000, cited by other.*

(Continued)

*Primary Examiner*—Cuong H. Nguyen
(74) *Attorney, Agent, or Firm*—Lowe Hauptman Ham & Berner, LLP

(57) ABSTRACT

This method uses for the estimation of a distance, a propagation distance transform considering only the paths which are both accessible to the aircraft taking account of its vertical flight profile and complying with air regulations. The propagated distance $D_p$ is accompanied by a propagated altitude $A_p$ which at all points follows the vertical flight profile of the aircraft, while being greater than the altitudes of these points and complying with the air regulation constraints at these points. This is obtained by subjecting the propagation to compliance with the vertical flight profile of the aircraft, constraints of the elevations of the points of the relief and air regulation constraints.

12 Claims, 8 Drawing Sheets

U.S. PATENT DOCUMENTS

| | | | |
|---|---|---|---|
| 6,112,141 A * | 8/2000 | Briffe et al. | 701/14 |
| 6,643,580 B1 * | 11/2003 | Naimer et al. | 701/206 |
| 6,720,891 B2 * | 4/2004 | Chen et al. | 340/969 |
| 6,816,780 B2 * | 11/2004 | Naimer et al. | 701/206 |
| 6,879,886 B2 * | 4/2005 | Wilkins et al. | 701/3 |
| 6,995,690 B1 * | 2/2006 | Chen et al. | 340/974 |
| 7,010,398 B2 * | 3/2006 | Wilkins et al. | 701/3 |
| 2003/0193410 A1 * | 10/2003 | Chen et al. | 340/971 |
| 2003/0222887 A1 * | 12/2003 | Wilkins et al. | 345/618 |
| 2004/0015274 A1 * | 1/2004 | Wilkins et al. | 701/3 |
| 2004/0111192 A1 * | 6/2004 | Naimer et al. | 701/9 |
| 2006/0059497 A1 | 3/2006 | Leriche et al. | |
| 2007/0031007 A1 | 2/2007 | Bitar | |
| 2007/0053609 A1 | 3/2007 | Bitar et al. | |
| 2007/0150117 A1 | 6/2007 | Bitar et al. | |
| 2007/0150121 A1 | 6/2007 | Bitar et al. | |
| 2007/0174005 A1 | 7/2007 | Bitar et al. | |
| 2007/0187554 A1 | 8/2007 | Bitar et al. | |
| 2007/0276553 A1 | 11/2007 | Bitar et al. | |

FOREIGN PATENT DOCUMENTS

| | | | |
|---|---|---|---|
| CA | 1238398 A | * | 6/1988 |
| DE | 3584553 G | * | 12/1991 |
| EP | 172221 A | * | 2/1986 |
| FR | 03 1120 B1 | | 12/2005 |
| JP | 61501283 W | * | 6/1986 |
| WO | WO 8503566 A | * | 8/1985 |

OTHER PUBLICATIONS

Systems for the detection and identification of nuclear explosions in the atmosphere and in space; Dickinson, H.; Tamarkin, P.; Proceedings of the IEEE; vol. 53, Issue 12, Dec. 1965 pp. 1921-1934.*

Operation of Current Navigation Aids and Future Prospects;Casserly, G.; Richardson, D.; Communications, IEEE Transactions on; vol. 21, Issue 5, May 1973 pp. 427-435.*

UWB propagation channels within an aircraft and an office building environment; Schmidt, I. et al.; Antennas and Propagation Society International Symposium, 2008. AP-S 2008. IEEE; Jul. 5-11, 2008 pp. 1-4; Digital Object Identifier 10.1109/APS.2008.4619553.*

Development of a functional specification for an in-vehicle safety advisory and warning system (IVSAWS); Mayhew, G.L.; Erlichman, J.; Shirley, K.L.; Streff, F.; Vehicle Navigation and Information Systems Conference, 1991; vol. 2, Oct. 20-23, 1991 pp. 1077-1091.*

Uplink Arrays for the Deep Space Network; Davarian, F.; Proceedings of the IEEE; vol. 95, Issue 10, Oct. 2007 pp. 1923-1930; Digital Object Identifier 10.1109/JPROC.2007.905047.*

Curve-Skeleton Properties, Applications, and Algorithms; Cornea, N.D.; Silver, D.; Min, P.; Visualization and Computer Graphics, IEEE Transactions on; vol. 13, Issue 3, May-Jun. 2007 pp. 530-548; Digital Object Identifier 10.1109/TVCG.2007.1002.*

Physical simulation of long distance and directional wireless channels; Meagher, C.; Olsen, R.; Cirullo, C.; de Jesus, C.; Ferro, R.C.; Military Communications Conference, 2008. MILCOM 2008. IEEE; Nov. 16-19, 2008 pp. 1 -5; Digital Object Identifier 10.1109/MILCOM.2008.4753090.*

Design of an agile radionavigation system using SDR techniques; Smith, S.F. et al,; Military Communications Conference, 2005. Milcom 2005. IEEE; Oct. 17-20, 2005 pp. 1127-1132 vol. 2; Digital Object Identifier 10.1109/MILCOM.2005.1605830.*

Exploring Landmark Placement Strategies for Self-Localization in Wireless Sensor Networks; Benbadis, F. et al.; Personal, Indoor and Mobile Radio Communications, 2007. PIMRC 2007. IEEE 18th International Symposium on; Sep. 3-7, 2007 pp. 1-5; Digital Object Identifier 10.1109/PIMRC.2007.4394634.*

SVM-KNN: Discriminative Nearest Neighbor Classification for Visual Category Recognition; Hao Zhang et al.; Computer Vision and Pattern Recognition, 2006 IEEE Computer Society Conference on; vol. 2, 2006 pp. 2126-2136; Digital Object Identifier 10.1109/CVPR. 2006.301.*

Gunilla Borgefors; "Distance Transformation in Digital Images"; Published in the Revue: Computers Vision, Graphics and Images Processing, vol. 34 pp. 344-378 in Feb. 1986.

Bitterman V et al: "Finder, a system providing complex decision support for commercial transport replanning operations", Digital Avionics Systems Conference, 25-28, Oct. 25, 1993.

Horng J-H et al: "Vehicle path planning by using adaptive constrained distance transformation", Pattern Recognition, Elsevier, Kidlington, GB, vol. 35, No. 6, Jun. 2002, pp. 1327-1337.

Bittermann V et al: "Finder, a System Providing Complex Decision Support for Commercial Transport Replanning Operations" Digital Avionics Systems Conference, 1993. 12TH DASC., AIAA/IEEE Fort Worth, TX, USA Oct. 25-28, 1993, New York, NY, USA, IEEE, US, pp. 141-146, XP010117076, ISBN: 0-7803-1343-7.

Horng J-H et al: "Vehicle Path Planning by Using Adaptive Constrained Distance Transformation"; Pattern Recognition, Elsevier, Kidlington, GB, vol. 35, No. 6, (2002-066), pp. 1327-1337, XP004341798; ISSN: 0031-3203.

* cited by examiner

FIG.1

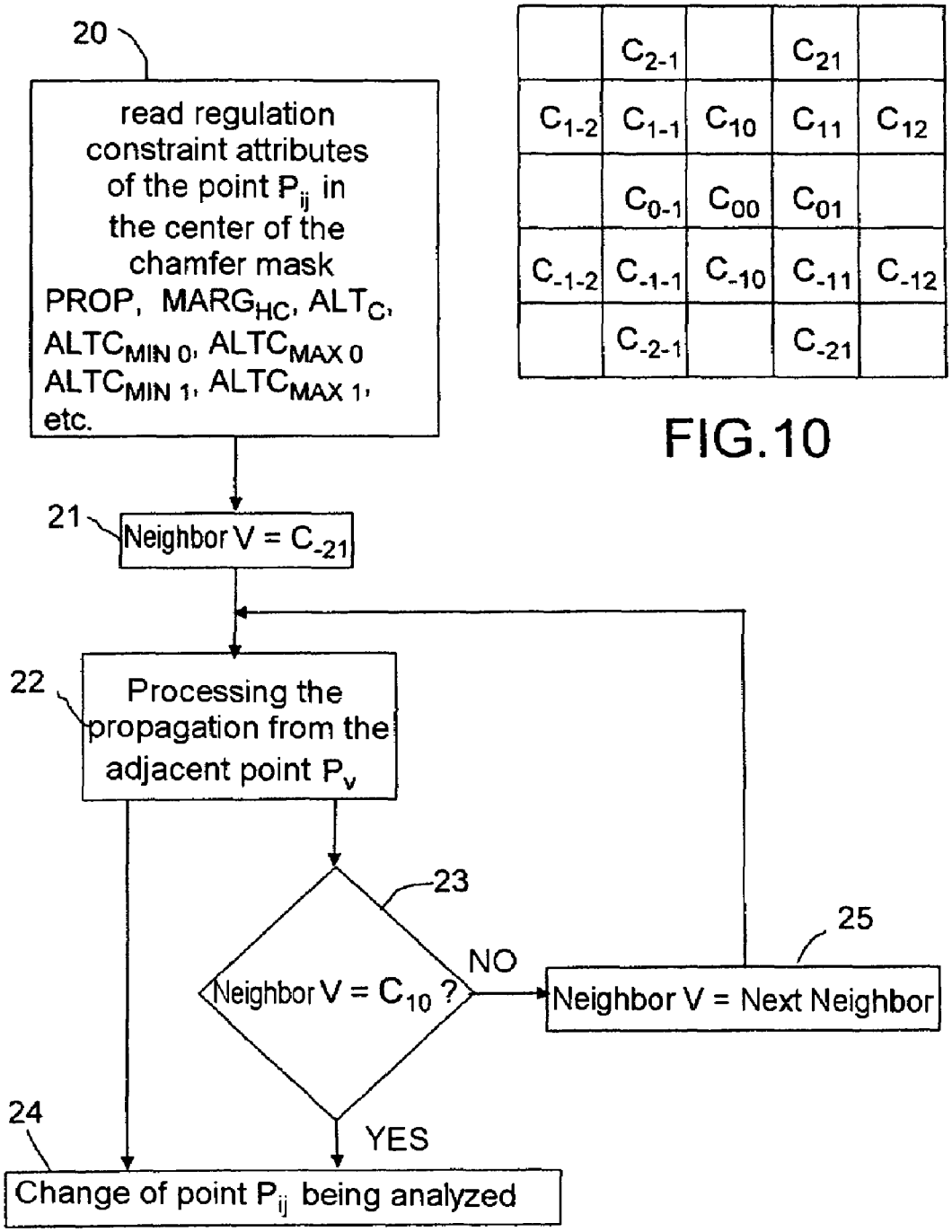

DISTANCE ESTIMATING METHOD FOR AIRCRAFT TAKING AIR NAVIGATION RESTRICTIONS INTO ACCOUNT

CROSS-REFERENCE TO RELATED APPLICATIONS

The present Application is based on International Application No. PCT/EP2005/051320, filed on Mar. 22, 2005, which in turn corresponds to France Application No. 04/04145 filed on Apr. 20, 2004, and priority is hereby claimed under 35 USC §119 based on these applications. Each of these applications are hereby incorporated by reference in their entirety into the present application.

This application is related to U.S. application Ser. No. 10/519,100 filed on Jun. 27, 2003; U.S. application Ser. No. 10/573,410 filed on Sep. 8, 2004; U.S. application Ser. No. 10/577,063 filed on Oct. 21, 2004; U.S. application Ser. No. 10/583,144 filed on Nov. 30, 2004; and U.S. application Ser. No. 10/590,083 filed on Feb. 8, 2005.

BACKGROUND OF THE INVENTION

Field of the Invention

The present invention relates to a navigation aid for an aircraft. It relates more particularly to the taking into account of overflight constraints restrictions imposed by air regulations during the establishment of the distance maps used for generating navigation aid maps displayed on the instrument panels of aircraft.

Distance maps gather the curvilinear distances separating the current position of the aircraft from the points of a mesh of a locating grid placed over a map of the overflown region. These distances are called curvilinear because they correspond to the minimum lengths of the joining paths that can be followed according to the vertical flight profile of the aircraft and taking account of the reliefs and obstacles on the ground to be circumvented.

One way of producing a distance map at low computing cost consists in using a propagation distance transform, also called a chamfer distance transform, which makes it possible to estimate global distances by propagation of local distances and which is restricted to calculations using whole numbers. One example is given in the French patent application number 0311320 lodged by the applicant on Sep. 26, 2003. In this example, the location grid used for the distance estimations is that used by a database of elevations of the terrain installed on board or consultable on board the aircraft. The distance estimation method described takes account of the vertical flight profile imposed on the aircraft and allows for developing obstacles to be circumvented, such as are reliefs seen by an aircraft which is moving at an altitude that varies over the course of time. However, it can lead to very unrealistic distance estimations in the case where these estimations are based on lengths of joining paths accessible to the aircraft but not authorized by air regulations whereas the only joining paths permitted are distinctly longer.

It is therefore advantageous to generate distance maps taking account not only of the vertical flight profile but also of the constraints and restrictions of air regulations such as, for example:

prohibited zones over which flight is prohibited at any altitude, regulated zones with an minimum overflight height, active regulated zones with prohibition of overflight outside of defined altitude ranges defined by altitude floors and ceilings, airport zones necessitating a minimum overflight height, except when in nominal approach condition, approach corridors imposed for access to certain destinations such as a landing runway entrance involving homing on a corridor entrance threshold and compliance with a heading requirement, joining slopes imposing vertical profile restrictions to be complied with in order to authorize approaching a position identified by its 3D geographic coordinates (Latitude, longitude, altitude), etc.

SUMMARY OF THE INVENTION

The purpose of the present invention is to meet this requirement.

It relates to a method of estimating distances of points in a map extracted from a terrain elevation database, with respect to an aircraft subjected, on the one hand, to dynamic altitude restrictions prohibiting it from crossing certain reliefs on the map that are too high whose configuration varies according to the vertical flight profile imposed upon it and, on the other hand, to constraints and restrictions coming from air navigation regulations; the terrain elevation database containing a set of points each referenced by an elevation, a latitude and a longitude, and corresponding to the regular meshing of a location grid; said method implementing, on the image constituted by the elements of the database which correspond to the map and are disposed in lines and columns in order of values of latitude and longitude, a propagation distance transform assimilating the distances of the different points of the image with respect to a source point placed close to the aircraft, to the shortest joining paths compatible with the dynamic altitude restrictions of the aircraft, and being noteworthy in that only the joining paths also complying with air navigation constraints and restrictions are considered by the propagation distance transform.

Advantageously, the air navigation restraints and restrictions are translated into local altitude constraints for each point in the terrain elevation database, the propagation distance transform considering only the joining paths accessible to the aircraft, of which all points comply with local altitude constraints.

Advantageously, the propagation distance transform propagates over the points of the image constituted by elements of the terrain elevation database, an altitude which the aircraft would take at this point after having traveled a joining path of minimum length in compliance with its vertical flight profile, called the propagated altitude, and a measurement of distance from the aircraft called the propagated distance, the propagated distance at a point being taken into account for a distance estimation only if the associated propagated altitude is greater than the elevation of the point in question appearing in the database and complies with the local altitude constraints.

Advantageously, the local altitude constraints at each point in the terrain elevation database are expressed by minimum and maximum authorized altitude attributes associated with the elevation value of the terrain at that point.

Advantageously, the points of the terrain elevation database are allocated with a binary propagation attribute authorizing or not authorizing, depending on its value, the propagation by the point in question of the propagation distance transform.

Advantageously, local altitude constraints are associated with the points of the terrain elevation database for creating virtual obstacles in line form around assemblies formed by destination points uniquely accessible by corridors imposed by air regulations, their imposed access corridors and the sides of the angular access sectors to these corridors, said virtual obstacles in line form constituting around these points lobster pot shaped guidance boundaries, forcing the propagation distance transform to consider only joining paths actually passing through the imposed access corridors.

Advantageously, local altitude constraints are associated with the points of the terrain elevation database for creating virtual obstacles in line form around assemblies formed by destination points uniquely accessible through corridors imposed by air regulations, their imposed access corridors and the sides of the angular access sectors to these corridors, said virtual obstacles in line form constituting around these points lobster pot shaped guidance boundaries and having loops at their ends forming lateral access roundabouts taking account of the limited turning radius of the aircraft.

Advantageously, binary propagation attributes of non authorized value are associated with the points of the terrain elevation database for creating virtual obstacles in line form around assemblies formed by the destination points uniquely accessible by corridors imposed by air regulations, their imposed access corridors and the sides of the access sectors to these corridors.

Advantageously, imposed minimum altitude attributes of infinite value are associated with the points in the terrain elevation database for creating virtual obstacles in line form around assemblies formed by the destination points uniquely accessible by corridors imposed by air regulations, their imposed access corridors and the sides of the access sectors to these corridors.

Advantageously, the propagation distance transform analyzes a point of the image constituted by elements of the terrain elevation database only after having verified that it has not been associated with a propagation attribute of non authorized value.

Advantageously, when a minimum authorized altitude attribute is associated with a point in the terrain elevation database, the distance transform takes into consideration for this point the highest of the elevation value and the minimum imposed altitude value instead and in place of the elevation of the point.

Advantageously, when a maximum authorized altitude attribute is associated with a point in the terrain elevation database and the propagation distance transform propagates over the points of the image constituted by elements of the terrain elevation database, an altitude which is the one which the aircraft would take after having traveled a joining path of minimum length whilst complying with its vertical flight profile, and a distance measurement from the aircraft, the distance propagated at a point is taken into account for a distance estimation only if the associated propagated altitude is greater than the elevation of the point in question appearing in the terrain elevation database and less than the value of the authorized maximum altitude attribute.

BRIEF DESCRIPTION OF THE DRAWINGS

Other features and advantages of the invention will emerge from the following description of an embodiment given by way of example. This description will be given with reference to the drawing in which:

FIG. 1 shows an example of a curvilinear distances map covering a zone where an aircraft is moving and having the current position of the aircraft as the origin of the distance measurements, FIG. 10 shows an indexing used for the individual referencing of elements of the chamfer mask shown in FIG. 2, FIG. 11 is a diagram illustrating the main steps of an analysis of a point of map by means of a chamfer mask of a propagation distance transform.

DETAILED DESCRIPTION OF THE DRAWINGS

Figure 1:
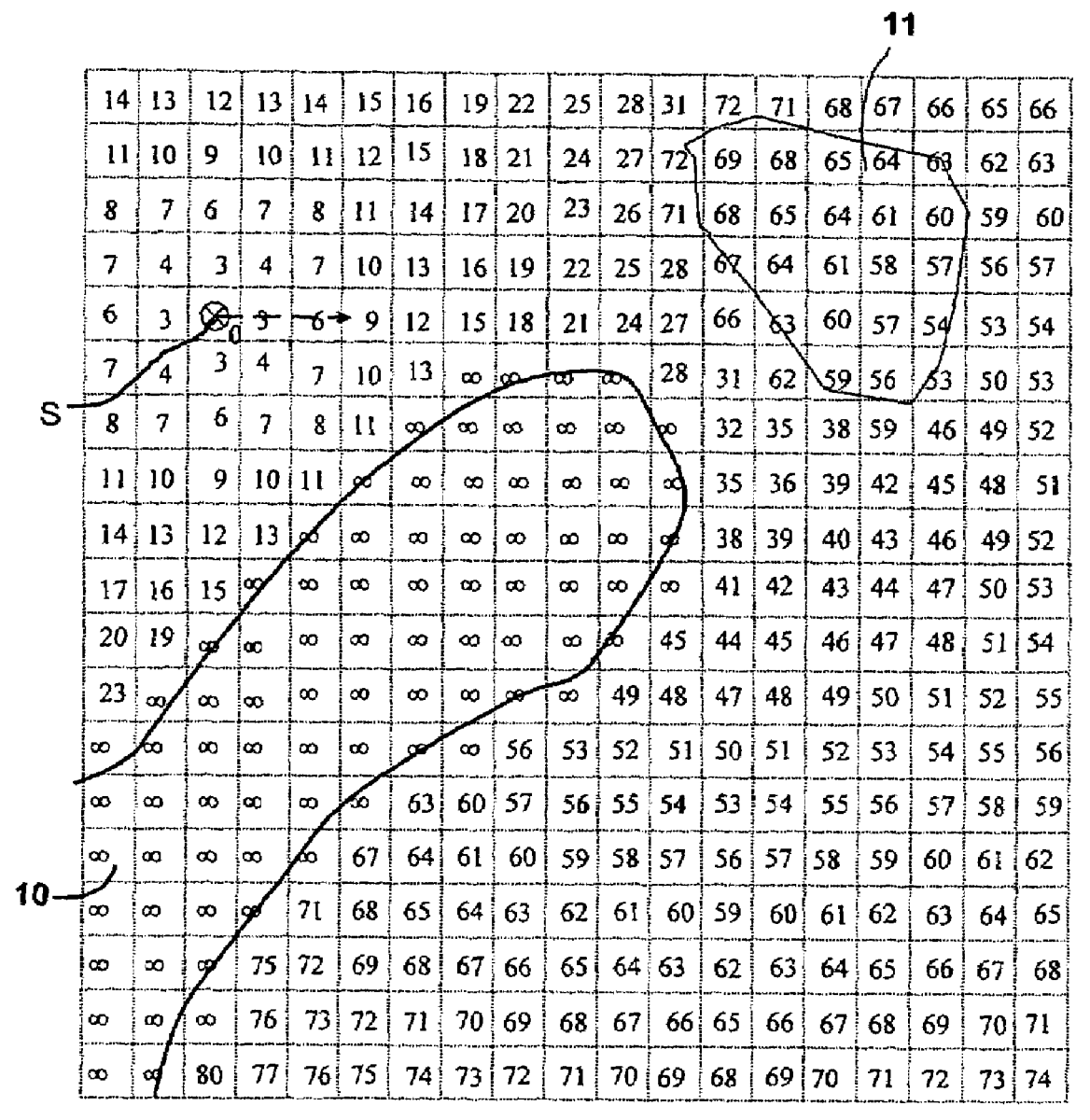

A map of distances over a movement zone is formed from the set of distance values of the points placed at the nodes of a regular mesh of the movement zone with respect to a point of the zone taken as the origin for the distance measurements. As shown in FIG. 1, it can be presented in the form of a table of values whose boxes corresponds to a division of the movement zone into cells centered on the nodes of the mesh. The regular mesh used is often that of the points of a terrain elevation database covering the movement zone. When a distance map is used for the navigation of an aircraft, the point of the zone taken as the origin for the distance measurements is the node of the mesh closest to the projection on the ground of the current position S of the aircraft. In FIG. 1, the aircraft which is at the point S is assumed to be moving in the direction of the arrow. The overflight zone covered has two reliefs that cannot be crossed by the aircraft, one of them 10 is completely impassable and the other one 11 is passable only by circumvention trajectories.

Distance maps are often produced using a propagation distance transform also known as a chamfer mask distance transform.

Chamfer mask distance transforms initially appeared in image analysis for estimating distances between objects. Gunilla Borgefors describes examples of them in her article entitled "Distance transformation in Digital Images" published in the revue: Computer Vision, Graphics and Image Processing, Vol. 34 pp 344-378 in February 1986.

The distance between two points of a surface is the minimum length of all possible journeys over the surface starting from one of the points and ending at the other. In an image formed of pixels distributed over a regular mesh of lines, columns and diagonals, a propagation distance transform estimates the distance of a pixel called the "target" pixel with respect to a pixel called the "source" pixel by progressively constructing, starting from the source pixel, the shortest possible path following the mesh of the pixels and ending at the target pixel, and being helped by the distances found for the pixels of the image already analyzed and by a table called a chamfer mask listing the values of the distance between a pixel and its close neighbors.

Figure 2:
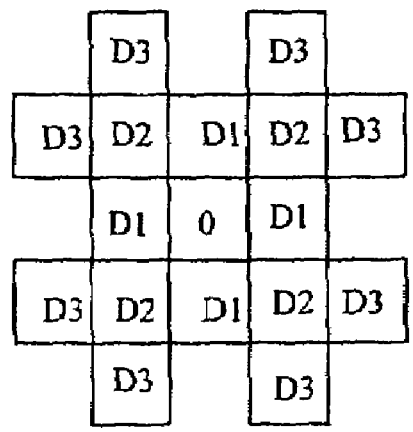
FIG. 2 shows an example of a chamfer mask usable by a propagation distance transform.

As shown in FIG. 2, a chamfer mask is presented in the form of a table with an arrangement of cells reproducing the pattern of a pixel surrounded by its close neighbors. In the center of the pattern, a cell allocated with the value 0 marks the pixel taken as the origin of distances listed in the table. Around this central cell are grouped peripheral cells filled with non-zero proximity distance values and taking the disposition of the pixels in the vicinity of the pixel assumed to occupy the central cell. The proximity distance value appearing in a peripheral cell is that of the distance separating a pixel occupying the position of the peripheral cell in question, from a pixel occupying the position of the central cell. It is noted that the proximity distance values are distributed in concentric circles. A first circle of four cells corresponding to the four pixels of first order, which are the closest to the pixel in the central cell, either on the same line, or on the same column, are allocated with a proximity distance value D1. A second circle of four cells corresponding to the four pixels of second order, which are pixels closest to the pixel of the central cell placed on the diagonals, are allocated with a proximity distance value D2. A third circle of eight cells corresponding to the eight pixels of third order, which are the closest to the pixel of the central cell whilst remaining outside of the line, the column and the diagonals occupied by the pixel of the central cell, are allocated with a proximity distance value D3.

The chamfer mask can cover a vicinity more of less extended from the pixel of the central cell by listing the values of the proximity distances of a larger or smaller number of concentric circles of pixels in the vicinity. It can be reduced to the first two circles formed by the pixels of the vicinity of a pixel occupying the central cell as in the example of a distance map shown in FIG. 1 or it can be extended beyond the first three circles formed by the pixels of the vicinity of the pixel of the central cell. It is usual to stop at the first three circles as for the chamber mask shown in FIG. 2. It is only for purposes of simplicity that stopping at two circles has been used for the distance map shown in FIG. 1.

The values of the proximity distances D1, D2, D3 which correspond to Euclidian distances are expressed in a scale whose multiplicative factor authorizes the use of integer numbers at the cost of a certain approximation. It is thus that G. Borgefors adopts a scale corresponding to a multiplicative factor of 3 or 5. In the case of a chamfer mask retaining the first two circles of proximity distance values, and therefore having dimensions 3×3, G. Borgefors gives the value 3 to the first proximity distance D1 which corresponds to an x coordinate or y coordinate and also to the scale multiplicative factor, and the value 4 to the second proximity distance value which corresponds to the square root of the sum of the squares of the x and y coordinates, $\sqrt{x^2+y^2}$. In the case of a chamfer mask retaining the first three circles, and therefore of dimensions 5×5, she gives the value 5 to the distance D1 which corresponds to the scale multiplicative factor, the value 7 to the distance D2, which is an approximation of $5\sqrt{2}$, and the value 11 to the distance D3, which is an approximation of the value $5\sqrt{5}$.

The progressive construction of the shortest possible path going to a target pixel and starting from a source pixel and by following the mesh of the pixels is carried out by a regular scanning of the pixels of the image by means of the chamfer mask.

Initially, the pixels of the image are allocated with an infinite distance value, in fact a number sufficiently high to exceed all measurable distances in the image, with the exception of the source pixel or pixels which are allocated with a zero distance value. The initial distance values allocated to the points are then updated during the scan of the image by the chamfer mask, an update consisting of replacing a distance value allocated to a target point by a new lower value resulting form a distance estimation made on the occasion of a new application of the chamfer mask to the target point in question.

A distance estimation by application of the chamfer mask to a pixel consists in listing all of the paths going from that target pixel to the source pixel and passing through a pixel in the vicinity of the target pixel whose distance has already been estimated during the same scan, in searching from among the listed paths for the shortest path or paths and in adopting the length of the shortest path or paths as the distance estimation. This is done by placing the target pixel for which it is desired to estimate the distance in the central cell of the chamfer mask, by selecting the peripheral cells of the chamfer mask corresponding to pixels of the vicinity whose distances have been updated, by calculating the lengths of the shortest paths connecting the target pixel to be updated to the source pixel whilst passing through one of the selected pixel of the vicinity, by addition of the distance allocated to the pixel of the vicinity in question and the proximity distance value given by the chamfer mask, and in adopting, as a distance estimation, the minimum of the path length values obtained and the old distance value allocated to the pixel being analyzed.

At the level of a pixel being analyzed by the chamfer mask, the progressive search for the shortest possible paths starting from a source pixel and going to the different target pixels gives rise to a phenomenon of propagation in directions of the pixels which are the closest neighbors of the pixel being analyzed and whose distances are listed in the chamfer mask. In the case of a regular distribution of the image pixels, the directions of the closest neighbors of a non-varying pixel are considered as axes of propagation of the chamfer mask distance transform.

The order of scanning pixels of the image has an effect on the reliability of the distance estimations and of their updates because the paths taken into account depend on it. In fact, it is subjected to a regularity constraint which means that if the pixels of the image are listed in lexicographical order (pixels classified in an increasing order, line by line starting from the top of the image and progressing towards the bottom of the image, and from left to right within a line), and if a pixel p has been analyzed before a pixel q then a pixel p+x must be analyzed before the pixel q+x. Lexicographic, reverse lexicographic (scanning the pixels of the image line by line from bottom to top within and within a line, from right to left), transposed lexicographic (scanning the pixels of the image column by column from left to right and, within a column, from top to bottom), reverse transposed lexicographic (scanning the pixels column by column from right to left and within a column from bottom to top) orders satisfy this condition of regularity and more generally all scannings in which the lines and the columns are scanned from right to left or from left to right. G. Borgefors recommends a double scanning of the pixels of the image, once in lexicographic order and another in the reverse lexicographic order.

The analysis of the image by the chamfer mask can be carried out using a parallel method or a sequential method. For the parallel method, the distance propagations are considered from all of the points of the mask which is made to pass over the totality of the image in several scans until no further changes are produced in the distance estimations. For the sequential method, the distance propagations are considered from only half of the points of the mask. The upper half of the mask is made to pass over all of the points of the image in a scan in lexicographic order and then the bottom half of the mask is made to pass over all of the points of the image in reverse lexicographic order.

Figure 3A:
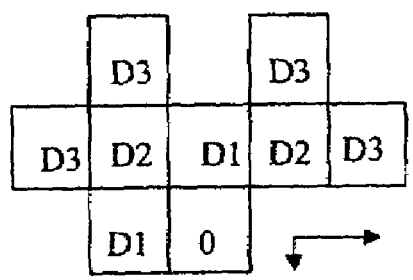
FIGS. 3a and 3b show the cells of the chamfer mask shown in FIG. 2, which are used in a scanning sweep in lexicographical order and in a scanning sweep in reverse lexicographical order.

FIG. 3a shows, in the case of the sequential method and of a scanning pass in lexicographic order going from the upper left corner to the lower right corner of the image, the cells of the chamfer mask shown in FIG. 2 used for listing the paths going from a target pixel placed on the central cell (cell indexed by 0) to the source pixel by passing through a pixel of the vicinity whose distance has already been the subject of an estimation during the same scan. There are eight of these cells disposed in the upper left part of the chamfer mask. There are therefore eight paths listed for the search for the shortest one whose length is used for the distance estimation.

Figure 3B:
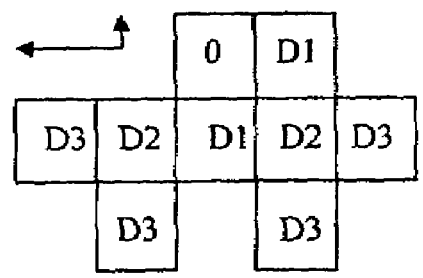

FIG. 3b shows, in the case of the sequential method and of a scanning pass in reverse lexicographical order going from the lower right corner to the upper left corner of the image, the cells of the chamfer mask shown in FIG. 2 used for listing the paths going from a target pixel placed on the central cell (cell indexed by 0) to the source pixel by passing through a pixel in the vicinity whose distance has already been the subject of an estimation during the same scan. These cells are complementary to those of FIG. 3a. There are also eight of them but disposed in the lower right part of the chamfer mask. There are therefore eight paths listed for the search for the shortest one whose length is used fort the distance estimation.

The propagation distance transform whose principle has just been briefly reviewed was designed originally for the analysis of the positioning of objects in an image but there was no delay in applying it to the estimation of distances on a relief map extracted from a terrain elevation database with regular meshing of the terrestrial surface. In fact, such a map does not explicitly have a metrical system since it is plotted on the basis of elevations of the points of the meshing of the terrain elevation database of the represented zone. In this context, the propagation distance transform is applied to an image whose pixels are the elements of the terrain elevation database belonging to the map, that is to say elevation values associated with the geographical latitude and longitude coordinates of the nodes of the mesh where they were measured, classified, as on the map, by increasing or decreasing latitude and longitude according to a two-dimensional table of latitude and longitude coordinates.

For land navigation of moving objects like robots, the chamfer mask distance transform is used for estimating curvilinear distances taking account of zones that are impassable because of their hilly configuration. In order to do this, a prohibited zone attribute can be associated with the elements of the terrain elevation database appearing in the map. It then signals, when it is activated, an impassable or prohibited zone and inhibits any updating, other than initializing, of the distance estimation made by the chamfer mask distance transform.

In the case of an aircraft, the configuration of the impassable zones develops according to the altitude resulting from keeping track of the vertical profile of its trajectory. During the production of a curvilinear distance map covering the overflown region, this is represented by fact that the propagation distance transform propagates over the points of the image constituted by elements of the terrain elevation database, at the same time, the altitude that the aircraft would assume at this point after having traveled a joining path of minimum length complying with its vertical flight profile, called the propagated altitude, and a measurement of distance from the aircraft, called the propagated distance, and that a propagated distance at a point is taken into account for a distance estimation only if the associated propagated altitude is greater than the elevation of the point in question appearing in the database.

In order to take account of the air regulations in the production of distance maps from a terrain elevation database, the elements of the terrain elevation database are allocated with specific regulation constraint attributes listing, at each corresponding point, the air regulation requirements: overflight prohibition, minimum authorized overflight height or altitude, authorized attitude ranges, heading or slope restriction. These air regulation constraint attributes can be acquired periodically from the terrain elevation database according to planned periods of validity of the regulation or on the occasion of the preparation of the flight plan. They can also be downloaded dynamically into an on-board terrain elevation database, for regions situated in the vicinity of the predictable route of the aircraft.

Figure 4:
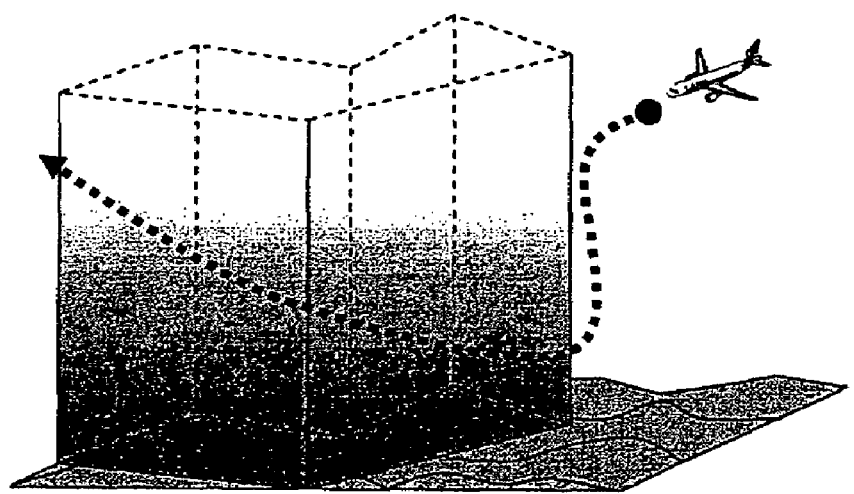
FIG. 4 shows the case of an aircraft finding on its trajectory an overflight prohibited zone to be circumvented laterally.

For the elements of the terrain elevation database belonging to prohibited zones, for which overflight is prohibited at any altitude and which must imperatively be circumvented laterally as shown in FIG. 4, the air regulation constraint attribute is either a simple binary propagation attribute with two values, one of them authorizing the propagation of the distance transform, and the other one P prohibiting it, or an altitude floor attribute given infinite value or an altitude ceiling attribute given zero value.

Figure 5:
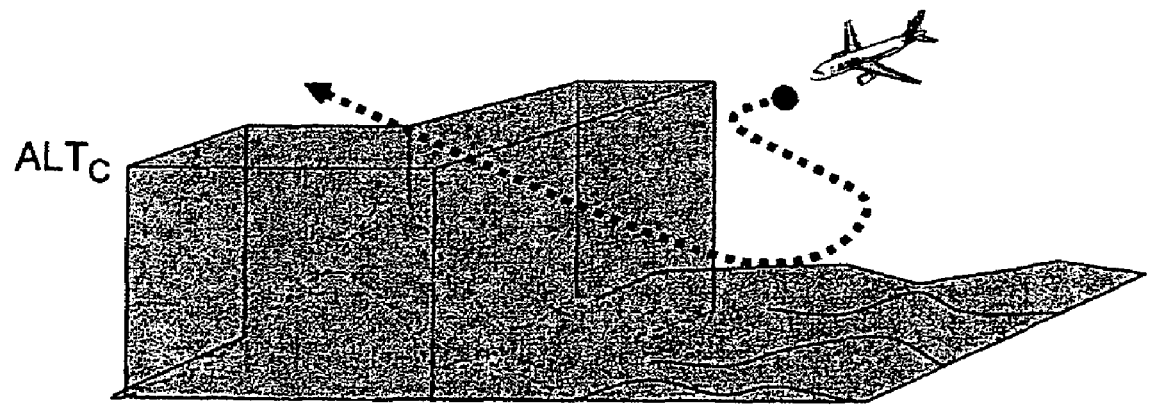
FIG. 5 shows the case of an aircraft finding on its route a zone with regulated minimum overflight altitude to be circumvented by a maneuver that is both lateral and vertical.

For the elements of the terrain elevation database belonging to regulated zones with a minimum overflight altitude, as shown in FIG. 5, the air regulation constraint attribute is an altitude floor attribute $ALT_C$.

Figure 6:
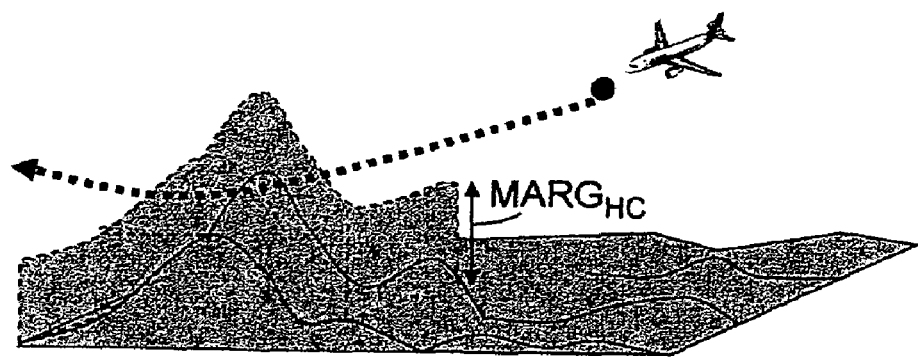
FIG. 6 shows the case of an aircraft finding in its trajectory a zone with regulated minimum overflight height to be circumvented by a lateral maneuver.

For the elements of the terrain elevation database belonging to regulated zones with a minimum overflight height, as shown if FIG. 6, the air regulation constraint attribute is a minimum height margin attribute $MARG_{HC}$.

For the elements of the terrain elevation database belonging to active regulated zones with overflight prohibition outside of corridors defined by altitude floors and ceilings, the air regulations constraint attributes are pairs of altitude floor $ALTC_{min\ i}$ and ceiling $ALTC_{max\ i}$ attributes.

When an approach corridor is imposed for access to a destination point, a virtual overflight obstacle, in line form, is used to constitute lobster pot shaped barriers forcing the distance transform to consider only trajectories whose lateral projection effectively passes through the lateral projection of the imposed approach corridor. The elements of the terrain elevation database belonging to the virtual overflight obstacle then have as air regulation constraints those of a prohibited zone, whereas those belonging to the imposed approach corridor and its access threshold have, as air regulation constraints, altitude floor and ceiling attributes $ALTC_{min\ 0}$, $ALTC_{max\ 0}$ converging towards the elevation of the destination point and complying with the imposed slope in the longitudinal axis of the approach corridor in such a way as to force the distance transform to consider, among the trajectories being projected on the lateral projection of an approach corridor, only those actually passing through the approach corridor and complying with its slope.

Figure 7:
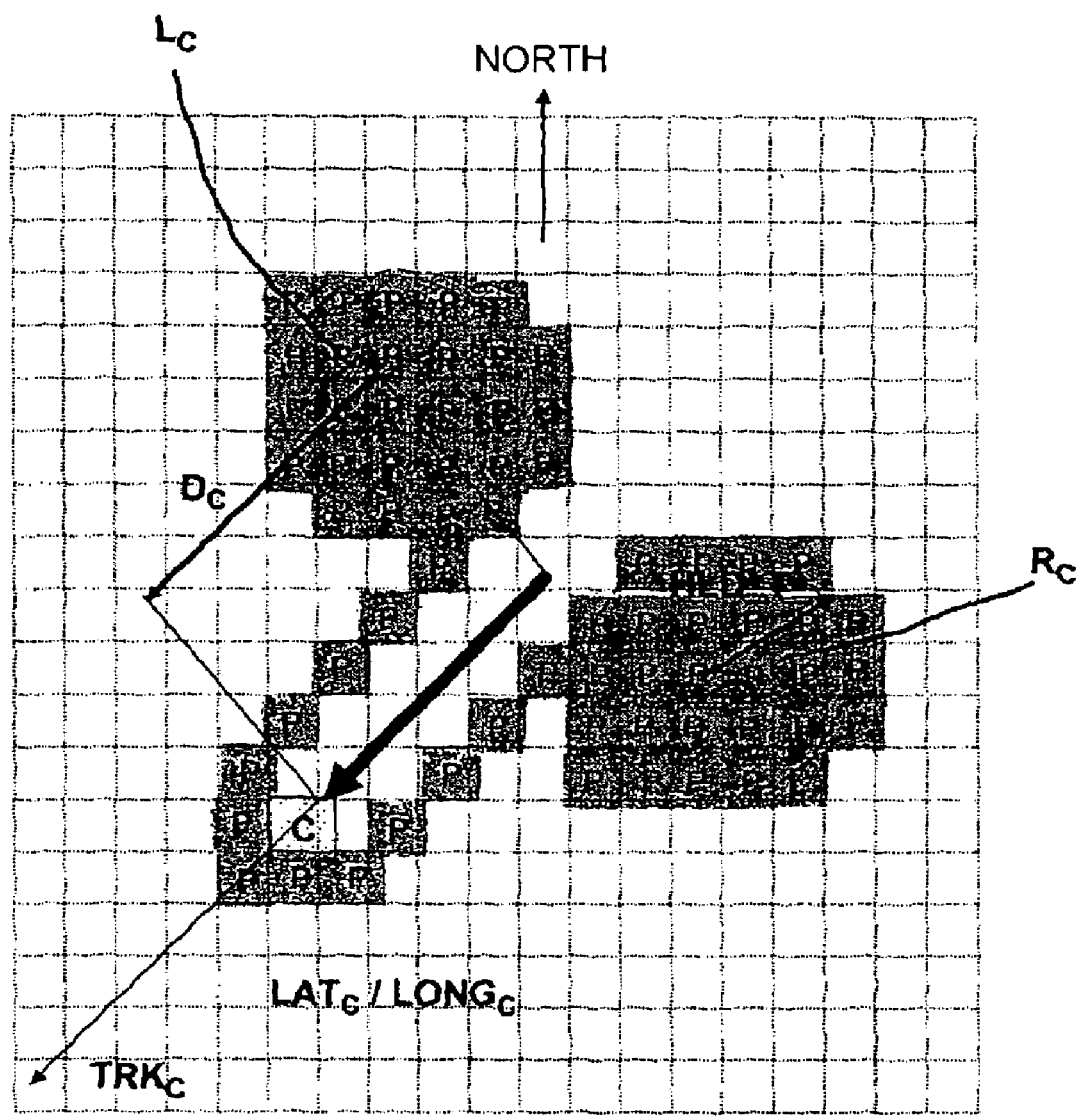
FIGS. 7 and 8 show, on a location grid, examples of virtual obstacles in line form used for forcing a propagation distance transform to follow an imposed approach corridor.

FIG. 7 shows an example of a prohibited overflight virtual obstacle, in line form. The elements of the terrain elevation database belonging to this virtual obstacle are marked, on a location grid used by the terrain elevation database, by an attribute to authorize propagation given the value P corresponding to a propagation prohibition. They surround the assembly formed by a destination point C of latitude $LAT_C$ and of longitude $LONG_C$, its imposed approach corridor, of heading $TRK_C$ and of length $D_C$, whose longitudinal axis and the direction of travel are marked by an arrow and the angular access sector to the approach corridor. In order to take account of the limited turn capability of the aircraft, the ends of the virtual obstacle in line form are turned back on themselves towards the outside in such a way as to form, on each side of the angular access sector to the approach corridor loops $L_C$ and $R_C$ to be circumvented whose internal area is also overflight prohibited. These loops can be circular, with a radius HLD_T satisfying the equation:

$$HLD\_T = \frac{GS^2}{g \times \tan(HLD\_B)}$$

g being the acceleration of gravity,
GS being the ground speed of the aircraft, and
HLD_B being the maximum accepted value of the roll angle used during a turn by the aircraft.

Figure 8:
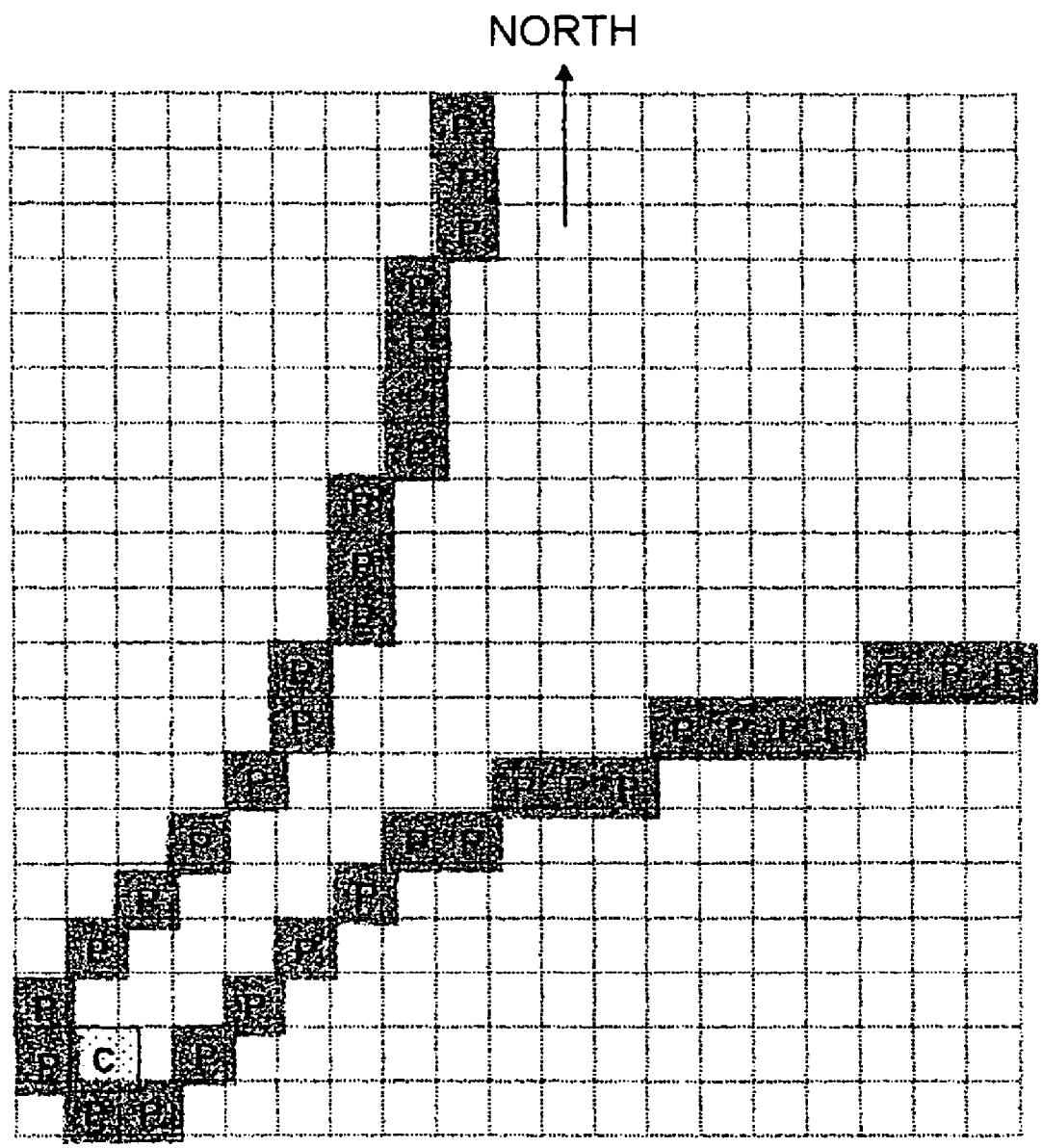

FIG. 8 shows another example of a virtual obstacle in line form which covers over a greater length the sides of the angular access sector to an approach corridor.

Figure 9A:
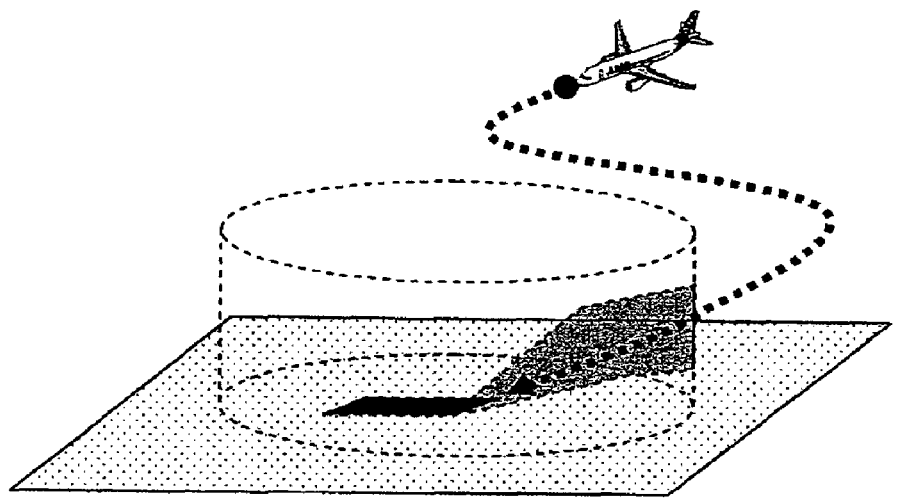
FIGS. 9a, 9b, 9c show, seen in three dimensions and in lateral and horizontal projections, an access corridor to a landing runway.
Figure 9B:
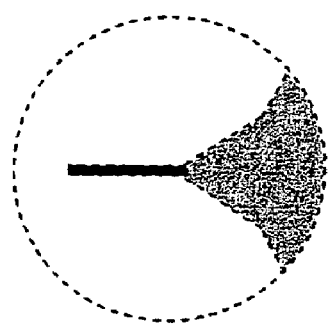
Figure 9C:

FIGS. 9a, 9b and 9c illustrate, in three dimensions and in lateral and horizontal projections, an approach corridor to a landing runway. The latter has a conical shape reducing as it approaches the runway. Compliance, by the distance transform, with its lateral profile, as seen in FIG. 9b, is the achievement of a virtual overflight prohibition obstacle, in line form, whereas that of its vertical profile, shown in FIG. 9c, is the achievement of altitude floor and ceiling attributes associated with the elements of the terrain elevation database over with the approach corridor is projected.

The different regulation constraint attributes associated with the elements of the terrain elevation database and the virtual obstacles in line form are taken into account by the propagation distance transform during the systematic analysis, by a chamfer mask, of the pixels of the image formed from elements of an elevation database of the terrain belonging to the mapped region.

The chamfer mask used by the propagation distance transform can have any dimensions whatsoever. It advantageously has the dimensions 3×3 or 5×5.

FIG. 10 shows the points of the vicinity brought into play during an analysis by a chamfer mask having the dimensions 3×3 according to the parallel method. These points are the four neighbors $C_{0-1}$, $C_{01}$, $C_{-10}$, $C_{10}$ closest to the point being analyzed $C_{00}$, either on the same line, or on the same column, the four neighbors $C_{-1-1}$, $C_{11}$, $C_{-11}$, $C_{1-1}$ closest to the point being analyzed $C_{00}$ on the two diagonals and the eight neighbors $C_{-1-2}$, $C_{-2-1}$, $C_{-21}$, $C_{-12}$, $C_{12}$, $C_{21}$, $C_{2-1}$, $C_{1-2}$ closest to the point being analyzed $C_{00}$ whilst remaining outside of its line, its column and its diagonals.

According to the sequential method, the chamfer mask is considered in parts:
an upper part (FIG. 3a) assembling: the two adjacent points $C_{0-1}$, $C_{10}$ closest to the point being analyzed $C_{00}$, either on the same line or on the same column, the two adjacent points $C_{11}$, $C_{1-1}$ closest to the point being analyzed $C_{00}$ on the two diagonals and the four adjacent points $C_{12}$, $C_{21}$, $C_{2-1}$, $C_{1-2}$ closest to the point being analyzed $C_{00}$ whilst remaining outside of its line, its column and its diagonals, and a lower part (FIG. 3b) assembling: the two adjacent points $C_{01}$, $C_{-10}$ closest to the point being analyzed $C_{00}$, either on the same line or on the same column, the two adjacent points $C_{-1-1}$, $C_{-11}$ closest to the point being analyzed $C_{00}$ on the two diagonals and the four adjacent points $C_{-1-2}$, $C_{-2-1}$, $C_{-21}$, $C_{-12}$ closest to the point being analyzed $C_{00}$ whilst remaining outside of its line, its column and its diagonals.

Figure 12:
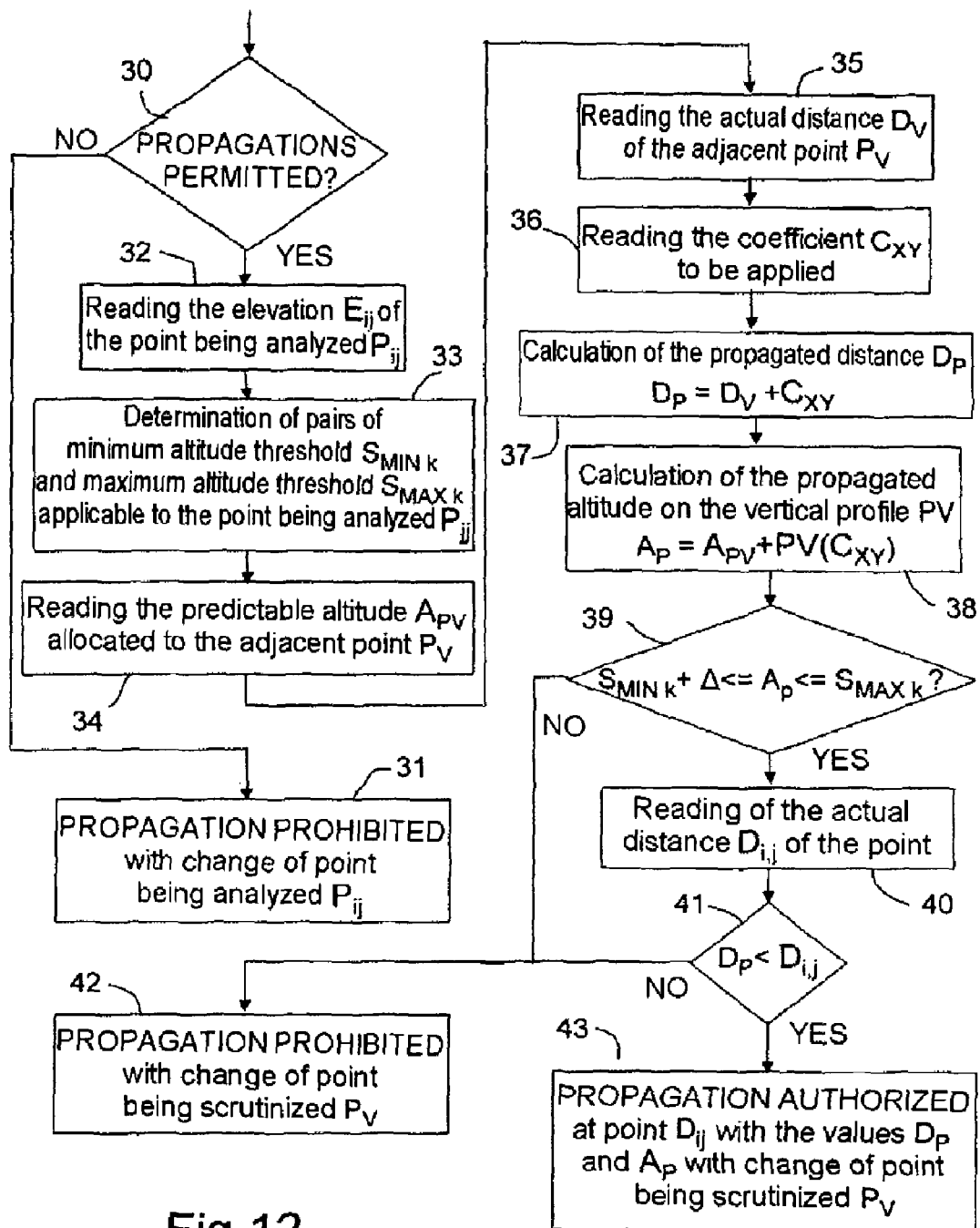
FIG. 12 is a diagram illustrating the main steps of processing the altitude and distance propagation carried out on a point being analyzed and on an adjacent point listed in a chamfer mask.

One way of carrying out the analysis of a point $P_{ij}$ by the chamfer mask, according to the parallel method, is illustrated by the logic flowchart shown in FIG. 11. This consists:

during a first step 20 in noting the latitude and longitude coordinates i, j of the image point $P_{ij}$ subjected to the analysis and placed at the center of the chamfer mask in the position $C_{00}$, and in reading the air regulation constraint attributes associated with that point $P_{ij}$, these attributes PROP, $ALT_C$, $MARG_{HC}$, $ALTC_{MIN\ 0}$, $ALTC_{MAX\ 0}$, $ALTC_{MIN\ 1}$, $ALTC_{MAX\ 1}$, etc being able to be present or not present, during a second step 21 in noting, in order to start the searching, a particular point $P_V$ in the close vicinity of the point being analyzed $P_{ij}$, preferably a point of the image at the periphery of the chamfer mask, for example the point in the position $C_{-21}$, during a third step 22 in proceeding with the processing of the propagation from the point $P_V$ being scrutinized, a processing which will be described in detail below with reference to FIG. 12, depending on the result of the processing of the propagation, either:

during a fourth step 23 in testing if the propagations from all of the points of the close vicinity of the position $C_{00}$ listed in the chamfer mask have been processed, during a fifth step 24 in changing the image point $P_{ij}$ being analyzed when all of the propagations from the points of the close vicinity listed in the chamfer mask have been tested, and during a sixth step 25 in changing the scrutinized point $P_V$ and in going back to the third step 22, when it appears that all of the propagations from the points of the close vicinity listed in the chamfer mask have not been tested, or:

going directly to the fifth step 24 of changing the image point $P_{ij}$ being analyzed.

The test of the end of scrutinizing all the points in the close vicinity, listed by the chamfer mask, carried out in the fourth step 23 can be carried out on the maximum value of an auxiliary counting index of these points which can always be selected in turn, in the same order, for example using the indexing of FIG. 10 again: $C_{-21}$, $C_{-12}$, $C_{12}$, $C_{21}$, $C_{2-1}$, $C_{1-2}$, $C_{-1-2}$, $C_{-2-1}$, $C_{-1-1}$, $C_{-11}$, $C_{11}$, $C_{1-1}$, $C_{0-1}$, $C_{-10}$, $C_{01}$, $C_{10}$.

The way of proceeding with the analysis of a point $P_{ij}$ by the chamfer mask, according to the sequential method is derived from it simply by adapting the scrutinizing of the points in the vicinity of the upper part and then of the lower part of the chamfer mask.

FIG. 12 gives an example of processing carried out during the application of the chamfer mask to a pixel $P_{ij}$ or target point, in order to estimate its distance for an aircraft having a vertical profile with an imposed trajectory and overflight constraints and limitations imposed by air regulations. The target point $P_{ij}$ is placed in the central cell of the chamfer mask. For each adjacent point $P_V$ which enters into the cells of the considered part of the chamfer mask, the totality of the mask or the upper or lower part, the processing consists in:

testing (step 30) the PROP attribute of the point $P_{ij}$ being analyzed, or if it is not present, the attribute $ALT_C$ in order to know if there is a propagation prohibition (the PROP attribute at the prohibition value P or the attribute $ALT_C$ at infinite value), if a propagation prohibition is detected:
prohibiting the propagation (step 31) and change the point being analyzed $P_{Vij}$ (move to step 24 of the flowchart shown in FIG. 11), if no propagation prohibition is detected:
reading (step 32) the elevation $E_{ij}$ of the point being analyzed $P_{ij}$ in the terrain elevation database, determining (step 33) at least one pair of altitude thresholds $S_{MIN\,k}$, $S_{MAX\,k}$ from the elevation value read and existing air regulation constraint attributes: $MARG_{HC}$, $ALT_C$, $ALTC_{MIN\,0}$, $ALTC_{MIN\,1}$, $ALTC_{MAX\,1}$, etc., the threshold $S_{MIN\,0}$ being taken equal to the elevation value increased by that of the attribute $MARG_{HC}$ or to the highest of the elevation values and the $ALT_C$ attribute when one of the two attributes $MARG_{HC}$ or $ALT_C$ exists and the thresholds $S_{MIN\,k}$ and $S_{MAX\,k}$ being taken as equal to the attributes $ALTC_{MIN\,k}$ and $ALTC_{MAX\,k}$, when they exist, reading (step 34) the predictable altitude $A_{PV}$ allocated to the point adjacent to the scrutinized point $P_V$, reading (step 35) the estimated distance $D_V$ of the adjacent point $P_V$, reading (step 36) the coefficient $C_{XY}$ of the chamfer mask corresponding to the cell occupied by the scrutinized adjacent point $P_V$, calculating (step 37) the propagated distance $D_P$ corresponding to the sum of the estimated distance $D_V$ of the scrutinized adjacent point $P_V$ and of the coefficient $C_{XY}$ allocated to the cell of the chamfer mask occupied by the adjacent point $P_V$:

$$D_P = D_V + C_{XY},$$

calculating (step 38) the propagated altitude $A_P$ of the aircraft from the predictable altitude $A_{PV}$ allocated to the scrutinized adjacent point $P_V$ and from the vertical flight profile PV:

$$A_P = A_{PV} + PV(C_{XY})$$

or directly from the distance $D_P$ if the vertical profile imposed on the aircraft's trajectory is defined as a function of the distance traveled $PV(D_P)$ and implicitly takes account of the travel time, or indirectly by the intermediary of the travel time if the vertical profile imposed on the aircraft's trajectory is defined by a speed of change of altitude, testing (step 39) if the propagated altitude verifies one of the inequalities:

$$S_{MIN\,k} + \Delta \leq A_P \leq S_{MAX\,k}$$

$\Delta$ being a safety margin and
K being an index marking the available pairs of regulation constraint attributes $ALTC_{MIN\,k}$, $ALTC_{MAX\,k}$ if no inequality is verified in the preceding step 39:
prohibiting (step 42) the propagation and change of scrutinized adjacent point $P_V$ (move to step 23 of the flowchart shown in FIG. 11), if one of the inequalities is verified in step 39:
reading (step 40) the distance $D_{ij}$ previously allocated to the point $P_{ij}$ being analyzed by the chamfer mask, comparing (step 41) the propagated distance $D_P$ with the distance $D_{ij}$ previously allocated to the point $P_{ij}$ being analyzed by the chamfer mask, if the propagated distance $D_P$ is greater than the distance $D_{ij}$ previously allocated to the point $P_{ij}$ being analyzed by the chamfer mask, move to step 42 of propagation and change of scrutinized adjacent point and from there, to step 23 of the flowchart shown in FIG. 11, and if the distance $D_{ij}$ previously allocated to the point $P_{ij}$ being analyzed by the chamfer mask is less than the propagated distance $D_P$ allocate (step 43) to the point $P_{ij}$ being analyzed by the chamfer mask the propagated distance $D_P$ and the propagated altitude $A_P$ and change the scrutinized adjacent point (move to step 23 of the flowchart shown in FIG. 11).

In brief, the propagation of a distance $D_P$ from an adjacent point listed in the chamfer mask is authorized only on two conditions:

the associated propagated altitude $A_P$ must be above a minimum altitude threshold $S_{MIN\,k}$ and possibly below a maximum altitude threshold $S_{MAX\,k}$, when such a threshold exists, and the propagated distance $D_P$ must be less than the distance previously allocated to the point affected by the propagation.

When there is no air regulations constraint, the minimum altitude threshold $S_{MIN\,k}$ is the elevation of the point in question appearing in the terrain elevation database. When the point in question belongs to an overflight prohibition zone, the point in question is either given a regulation constraint attribute PROP prohibiting any propagation, or a minimum altitude threshold $S_{min\,K}$ given an infinite value or at least one that is inaccessible to the aircraft. When the point in question belongs to a regulated zone with a minimum overflight height, the minimum altitude threshold $S_{MIN\,k}$ is the sum of the elevation of the point in question appearing in the terrain elevation database and a regulation constraint attribute $MARG_{HC}$ associated with the point in question and corresponding to a minimum imposed height margin. When the point in question belongs to a regulated zone with a minimum overflight altitude, the minimum altitude threshold $S_{MIN\,k}$ is the highest of the elevation values of the point in question and the minimum imposed altitude appearing in a regulation constraint attribute $ALT_C$ associated with the point in question. When the point in question belongs to a regulated zone with prohibited overflight outside of defined altitude ranges defined by altitude floors and ceilings, pairs of regulation constraint attributes $ALTC_{MIN\,k}$, $ALTC_{MAX\,k}$ are associated with the point in question and taken as altitude thresholds $S_{MIN\,k}$ and $S_{MAX\,k}$. Finally, for the destination points with an imposed access corridor, virtual obstacles with prohibited overflight constrain the distance transform to consider for these points only the paths passing through the imposed access corridor.

The invention claimed is:

1. A method of estimating distances of points in a map extracted from a terrain elevation database, with respect to an aircraft subjected, to dynamic altitude restrictions prohibiting it from crossing certain reliefs on the map that are too high whose configuration varies according to the vertical flight profile imposed upon it and, to constraints and restrictions coming from air navigation regulations; the terrain elevation database having a set of points each referenced by an elevation, a latitude and a longitude, and corresponding to the regular meshing of a location grid; the methods comprising the steps of implementing, on the image constituted by the elements of the database which correspond to the map and are disposed in lines and columns in order of values of latitude and longitude, a propagation distance transform assimilating the distances of the different points of the image with respect to a source point placed close to the aircraft, to the shortest joining paths compatible with the dynamic altitude restrictions of the aircraft and with air navigation constraints and restrictions.

2. The method according to claim 1, wherein the air navigation constraints and restrictions are translated into local altitude constraints for each point in the terrain elevation database, the propagation distance transform considering only the joining paths accessible to the aircraft, of which all points comply with local altitude constraints.

3. The method according to claim 2, wherein the propagation distance transform propagates over the points of the image constituted by elements of the terrain elevation database, the altitudes which the aircraft would take at these point after having traveled joining paths of minimum length in compliance with its vertical flight profile, called the propagated altitudes, and measurements of distance from the aircraft called the propagated distances, a propagated distance at a point being taken into account for a distance estimation only if the associated propagated altitude is greater than the elevation of the point in question appearing in the terrain elevation database and complies with the local altitude constraints.

4. The method according to claim 2, wherein the local altitude constraints at each point in the terrain elevation database are expressed by minimum and maximum authorized altitude attributes associated with the elevation value of the terrain at that point.

5. The method according to claim 2, wherein the points of the terrain elevation database are allocated with a binary propagation attribute authorizing or not authorizing, depending on its value, the propagation to the point in question of the propagation distance transform.

6. The method according to claim 2, wherein local altitude constraints are associated with the points of the terrain elevation database for creating virtual obstacles in line form around assemblies formed by destination points uniquely accessible by corridors imposed by air regulations, their imposed access corridors and the sides of the angular access sectors to these corridors, said virtual obstacles in line form constituting around these points lobster pot shaped guidance boundaries, forcing the propagation distance transform to consider only joining paths actually passing through the imposed access corridors.

7. The method according to claim 6, wherein the ends of the virtual obstacles in line form are turned back towards the outside in the form of loops and constitute, at the entrance to the access corridors, lateral access roundabouts taking account of the limited turning radius of the aircraft.

8. The method according to claim 6, wherein binary propagation attributes of non authorized value are associated with the points of the terrain elevation database belonging to virtual obstacles in line form.

9. The method according to claim 6, wherein imposed minimum altitude attributes of infinite value are associated with the points of the terrain elevation database belonging to the virtual obstacles in line form.

10. The method according to claim 5, wherein the propagation distance transform analyzes a point of the image constituted by elements of the terrain elevation database only after having verified that it has not been associated with a propagation attribute of non authorized value.

11. The method according to claim 4, wherein the distance transform takes into consideration for a point the highest of the elevation value and the minimum imposed altitude value instead and in place of the elevation of the point.

12. The method according to claim 1, wherein, when a maximum authorized altitude attribute is associated with a point in the terrain elevation database and the propagation distance transform propagates over the points of the image constituted by elements of the terrain elevation database, an altitude which is the one which the aircraft would take after having traveled a joining path of minimum length whilst complying with its vertical flight profile, and a distance measurement from the aircraft, the distance propagated at a point is taken into account for a distance estimation only if the associated propagated altitude is greater than the elevation of the point in question appearing in the terrain elevation database and less than the value of the authorized maximum altitude attribute.

* * * * *